United States Patent
Smith

(10) Patent No.: US 8,209,503 B1
(45) Date of Patent: *Jun. 26, 2012

(54) DIGITAL LOCKED LOOP ON CHANNEL TAGGED MEMORY REQUESTS FOR MEMORY OPTIMIZATION

(75) Inventor: Ronald D. Smith, Phoenix, AZ (US)

(73) Assignee: Marvell International Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/196,122

(22) Filed: Aug. 2, 2011

Related U.S. Application Data

(63) Continuation of application No. 12/107,694, filed on Apr. 22, 2008, now Pat. No. 7,996,642.

(60) Provisional application No. 60/913,915, filed on Apr. 25, 2007.

(51) Int. Cl.
 *G06F 12/00* (2006.01)
(52) U.S. Cl. .................................................. 711/154
(58) Field of Classification Search .................. None
 See application file for complete search history.

(56) References Cited

U.S. PATENT DOCUMENTS

| | | | |
|---|---|---|---|
| 5,682,273 | A | 10/1997 | Hetzler |
| 5,802,344 | A | 9/1998 | Menon et al. |
| 6,615,308 | B1 | 9/2003 | Fanning |
| 7,437,557 | B2 | 10/2008 | Lee et al. |
| 7,716,425 | B1 | 5/2010 | Uysal et al. |
| 2003/0229766 | A1 | 12/2003 | Dice et al. |
| 2008/0089139 | A1 | 4/2008 | Ong |
| 2010/0223423 | A1 | 9/2010 | Sinclair et al. |

*Primary Examiner* — Brian Peugh

(57) ABSTRACT

A method and system for performing memory optimization is described. In one embodiment, a method includes receiving a plurality of read/write requests, wherein at least a portion of the read/write requests are assigned respective identifiers for associating related requests of the read/write requests. Arrival times of the read/write requests assigned to each of the identifiers is measured and predicted arrival times of future read/write requests assigned to each of the identifiers is determined. A real-time schedule of memory requests is created using the arrival times of the read/write requests and the predicted arrival times. The method includes using the real-time schedule to determine idle periods and performing opportunistic functions in the memory during the idle periods, including performing at least one of garbage collection or translation cache pre-fetch.

20 Claims, 7 Drawing Sheets

500

| R/W Command 502 | Address 504 | Data Packet 506 | Channel ID 508 |

FIG. 5

DIGITAL LOCKED LOOP ON CHANNEL TAGGED MEMORY REQUESTS FOR MEMORY OPTIMIZATION

CROSS-REFERENCE TO RELATED APPLICATIONS

This is a continuation application of U.S. patent application Ser. No. 12/107,694 entitled "DIGITAL LOCKED LOOP ON CHANNEL TAGGED MEMORY REQUESTS FOR MEMORY OPTIMIZATION," filed Apr. 22, 2008, now U.S. Pat. No. 7,966,642 by Ronald D. SMITH, and assigned to the present assignee, and claims benefit of provisional Patent application Ser. No. 60/913,915, filed Apr. 25, 2007, and incorporated herein by reference.

BACKGROUND

Flash memory is one type of non-volatile, rewritable memory commonly used in many types of electronic devices, such as USB drives, digital cameras, mobile phones, and memory cards. Flash memory typically stores information in an array of memory cells made from floating-gate transistors. In traditional single-level cell (SLC) devices, each cell stores only one bit of information. Some newer flash memory, known as multi-level cell (MLC) devices, can store more than one bit per cell by applying multiple levels of electrical charge to the floating gates of memory cells.

A NAND flash memory (referred to herein as "NAND memory") is accessed by a host system much like a block device such as a hard disk or a memory card. Typically, the host system performs reads and writes to logical block addresses. A NAND memory is typically divided into blocks and each block is generally organized into pages or sectors of cells. Blocks may be typically 16 KB in size, while pages may be typically 512 or 2,048 or 4,096 bytes in size. Multi-level NAND cells makes management of NAND memories more difficult, particularly in multithreaded real-time run-time environments.

In response, manufacturers have encapsulated NAND memories as memory devices in which a controller is placed in front of a raw NAND memory. The purpose of the controller is to manage the underlying physical characteristics of the raw NAND memory and to abstract the interface as a logical block device. This allows the NAND memory to provide a logical to physical translation map between logical block addresses (which are being accessed by a host system) and physical locations in the NAND memory, and to manage rules governing the logical to physical translation mapping internally via firmware in a NAND controller.

Reading and writing are asymmetric behaviors in NAND memories. To read a particular physical block, the address is programmed, and the read operation started. After an access time, the data is available. This process of reading blocks can be repeated ad infinitum (ignoring certain NAND disturb phenomenon). Writing blocks is an asymmetric operation because a given block can only be written with data essentially only one time, and so a write is not repeatable like a read.

The initial condition of a NAND cell is to store a logical '1'. To write a data value, wherever there is to be a '0', the data is written and the '1' states are left alone. While it may be possible to continue to overwrite '1' states with '0' states, this is not generally useful. To completely enable the overwriting of a block, the initial condition must be again established. This operation is referred to as an erase cycle.

Using currently available NAND memories as an example, typical read access times are in the range of 25-50 microseconds, write cycle times are in the range of 200-700 microseconds, and erase cycle times are in the range of 2,000-3,000 microseconds. Clearly there is a tremendous variance in performance, depending on the exact circumstances.

In order to mitigate the vast difference between erase and read cycle times, write blocks are typically grouped together into erase blocks so that the time to erase is amortized over many write blocks, effectively reducing the erase time on a per page basis. In addition, generally more read operations can be performed on a block than erase/write cycle pairs. While there are technological subtleties, generally reads are non-destructive. Because of the nature of the charge storage on the floating gates, erase/write cycle pairs tend to damage the storage cells due to trapped charge in the oxide of floating gate transistors. For this reason, erase/write cycle pairs should be algorithmically avoided, or when inevitable should be balanced across all blocks. This later mechanism is referred to as "wear leveling".

Because of the impracticality of overwriting data (both because of the wear mechanism and erase block grouping), various techniques are used to virtualize the location of any given logical block. Within the current state of the art is what is called a file translation layer (FTL). This is a driver level software layer which maintains temporary and permanent tables of the mapping between a given logical block number and a physical location of the block in the media. By presenting a logical block device to upper layers of software, any number of file systems may be implemented. Alternatively, a journaling file system may be implemented using the linear array of blocks. Here, the blocks are allocated in order of need and the device block allocation is managed as (essentially) a large circular buffer.

As alluded to above, data on NAND memories can be written in a unit of one page, but an erase is performed in the unit of one block. A page can be written only if the page is erased, and a block erase will clear the data on all pages associated with a given block. Because a NAND memory is write-once, pages are allocated in a block until all the pages in the block are used. Regardless of the specific implementation, obsolete or "overwritten" data in the NAND array is not truly overwritten but simply marked by the number of mechanisms as simply being obsolete or stale. Logically, a block that contains live data is called a valid block, and an "obsolete" block is one that contains obsolete or stale data. If a file is written too many times, for example, it may result in many obsolete blocks in the NAND array.

When all (or nearly all) blocks contain data, blocks that have been written earlier may possibly contain stale data and therefore invalid data. When the NAND memory is full or almost full, it becomes necessary to remove the stale data and efficiently pack the remaining valid data to make room in the NAND memory. This process is referred to as "garbage collection".

FIG. 1 is a block diagram illustrating a conventional garbage collection on a NAND memory 10. The garbage collection process on the NAND memory 10 includes a pre-collection phase 12 and post collection phase 14. During the pre-collection phase 12, all the blocks to be erased, called erase blocks, are examined. Blocks that are stale are available. Blocks that are not stale must be made stale by moving data in the blocks, i.e., rewriting the data into a new area. Erase blocks to be erased in a group comprise an erase cluster 16. In this example, the erase cluster 16 includes three valid blocks and one obsolete block 18. The valid blocks are being moved to respective blocks in free cluster 20. For this reason, garbage collection is not done when the NAND memory 10 is truly full, but is instead done when the block allocation crosses some threshold determined by file translation management requirements. After all blocks are made stale in the erase cluster 16, the blocks are erased and made available during post collection 14, resulting in free cluster 22. The new beginning of the log 24 is the end of the free cluster 22, and the new end of the log 26 is that last block that was moved.

Because garbage collecting an erase block involves read-then-write operations—first the block must be read to determine its current state and may involve data movement (i.e., writing good data elsewhere to make the current block stale) it can be quite time consuming to perform. The garbage collection time is the sum of the erase time, the summation of the rewritten block and the summation of the other reads necessary to determine the block state. If erase blocks are garbage collected in groups/clusters as shown in FIG. 1, this erase time is yet again increased proportional to the number of blocks being garbage collected.

Because it is not necessarily predictable to an application, operating system (OS), or a file system when a block driver needs to perform garbage collection, any throughput analysis must be able to tolerate a reasonably large asynchronous interruption in performance for the above described garbage collection. This is particularly true because in conventional systems, garbage collection is likely to be delayed until necessary.

In addition, a NAND memory (e.g., a NAND memory comprising a controller) typically maintains a translation cache to improve the speed of the logical to physical translations. The translation cache has a fixed number of entries that map the logical block addresses onto the physical addresses (e.g., NAND pages). The translation cache can be searched by a requested logical block address and the result is the physical address. If the requested address is present in the translation cache, the search yields a match very quickly, after which the physical address can be used to access the NAND memory. If the requested address is not in the translation cache, the translation proceeds by reading translation tables, which contain a larger set of translation entries, and are slower to access. These additional reads can delay performance of the NAND memory.

For a single threaded application, such as in a digital still camera, NAND memory performance can be optimized according to the usage model, and with currently available products in the memory category (e.g., Compact Flash and SD Card) often are. The camera usage model is to: 1) format a flash card; 2) take a picture, writing the data to the card as fast as possible (to minimize click-to-click time); 3) view random pictures to perform edits (e.g., deletion of unwanted pictures); and 4) mass transfer of picture files to another host (such as a desktop or laptop computer). Only steps 2) and 4) have real time performance requirements, and the usage of the storage is highly focused. When writing a new picture to the NAND memory, all the NAND memory has to do is be able to sustain sufficiently high write bandwidths. Conversely, when the NAND memory has to read picture files to transfer to a host, all the NAND memory is required to do is sustain sufficiently high read bandwidths.

However, on more complex platforms where there may be multiple streams being read and written to the NAND memory, and each stream may have its own characteristics including real-time requirements. Therefore, optimization is not nearly so simple because there are conflicting requirements.

Consider as an example, a multithreaded environment in which two software applications are processing three file streams. A first application is recording a real-time media stream (either video or audio) onto the NAND memory, while the same application is also playing back either the same or a different media stream. (If the first application is playing back the same media stream, the first application plays back the media stream at an earlier time point in the stream.) Assume that the second application is an e-mail client that is receiving e-mail updates over an internet connection and synchronizing the in-box.

In this example, these two applications have different real-time requirements. The media streaming performed by the first application cannot be halted, whereas the e-mail synchronization performed by the second application has no a priori timing requirement. If the media stream write overflows, data will be lost. If the media stream read underflows, there will be gaps in the video or audio playback. If there are delays in the e-mail synchronization, however, the performance will be affected, but since this is demand driven, there is no loss of data.

Typically, media streams are taken from some kind of media source (e.g., over-the-air modem or stored media) at a constant packet rate. These packets may be stored into a ping-pong buffer to make the system resilient to variable latencies in some operations. Media stream data is written into the ping buffer until the ping buffer is full, then the media stream data is written into the pong buffer. When the ping buffer is full, the media stream data is read out and passed along to the next stage in the processing pipeline (e.g., the ping buffer is emptied by software which stores the data onto the NAND memory). If the pong buffer is not empty by a consumer by the time the producer is finished loading the ping buffer, there is an overflow situation. If the consumer needs the ping buffer before the ping buffer has been filled, there is an underflow situation.

Large asynchronous garbage collection operations of NAND memories may complicate the real-time needs real-time applications, such as in the media stream example. Garbage collection represents a worst case deviation in the typical write access times to NAND memories, and this deviation can be extreme when compared to the typical result. Translation cache misses, while not as disruptive as garbage collection, also add to the performance uncertainty of NAND memories. The above scheme of using ping/pong buffers can accommodate large and variable latencies only if these latencies are bounded, and these buffers can do so at the expense of becoming very large. This places an additional burden on the platform in that the platform now requires very large media buffers in order to accommodate an operating condition that rarely occurs.

NAND memories lack an overall context to globally optimize garbage collection and translation cache pre-fetch processes because NAND memories do not have knowledge of the semantics of a given block operation.

BRIEF SUMMARY

In one embodiment, a method includes receiving a plurality of read/write requests, wherein at least a portion of the read/write requests are assigned respective identifiers for associating related requests of the read/write requests. Arrival times of the read/write requests assigned to each of the identifiers is measured and predicted arrival times of future read/write requests assigned to each of the identifiers is determined. A real-time schedule of memory requests is created using the arrival times of the read/write requests and the predicted arrival times. The method includes using the real-time schedule to determine idle periods and performing opportunistic functions in the memory during the idle periods, including performing at least one of garbage collection or translation cache pre-fetch.

According to the method and system disclosed herein, the read/write requests are tagged with identifiers, such as channel IDs, to provide the memory context, such as the relationship of the read/write request to other read/write request. Thus, the exemplary embodiments provide the memory with a global view of the semantics of the logical block accesses and allow the memory to perform internal optimizations during those idle periods, such as performing background garbage collection operations, rather than waiting until the memory is substantially full, and optimizing data availability in the translation cache to fulfill logical to physical translations in response to future logical block accesses. Accordingly, one or more embodiments disclosed herein provides a solution that balances the need for NAND management of the garbage collection process and/or the translation cache pre-fetch process with the needs of applications having different real-time media requirements.

BRIEF DESCRIPTION OF SEVERAL VIEWS OF THE DRAWINGS

FIG. 5 is a diagram illustrating a format of a channel tagged read/write request for optimizing performance of the NAND memory in accordance with one exemplary embodiment.

DETAILED DESCRIPTION

The present invention relates to the use of a digital locked loop on channel tagged memory requests for memory optimization. Various modifications to the one or more embodiments and the generic principles and features described herein may be made. Thus, the present invention is not intended to be limited to the embodiments shown, but is to be accorded the widest scope consistent with the principles and features described herein.

One or more embodiments disclosed herein provides for use of a digital locked loop on channel tagged memory requests for performing internal optimization of a memory, such as a NAND memory. The exemplary embodiments will be described in terms of NAND memory components. However, the exemplary embodiments may be used with any type of non-volatile memory management system or device in which garbage collection is necessary, such as any other type of FLASH memory or other types of memories, including phase change memory, for instance. The exemplary embodiments will also be described in the context of particular methods having certain steps. However, the method and system operate effectively for other methods having different and/or additional steps not inconsistent with the exemplary embodiments. In addition, one or more steps of the methods may be performed in a different order or concurrently and still achieve desirable results.

Figure 1:
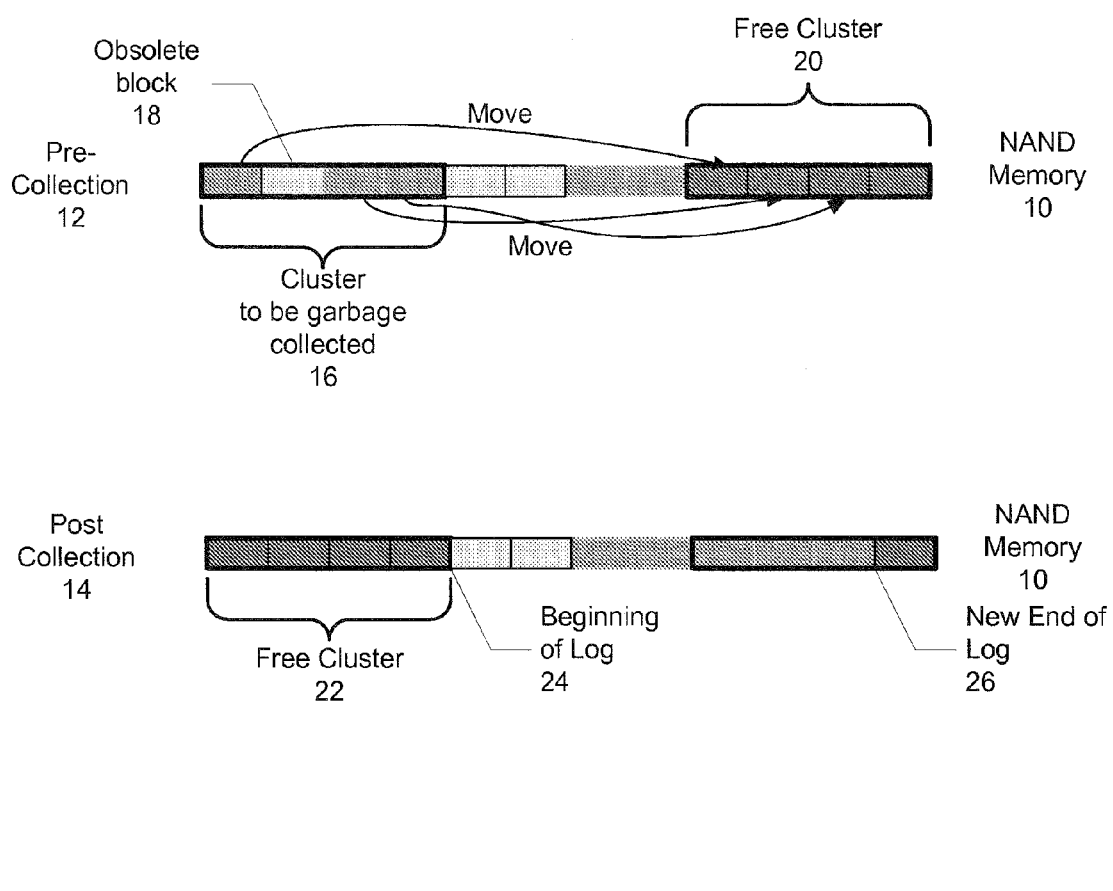
FIG. 1 is a block diagram illustrating a conventional garbage collection on a NAND memory.
Figure 2:
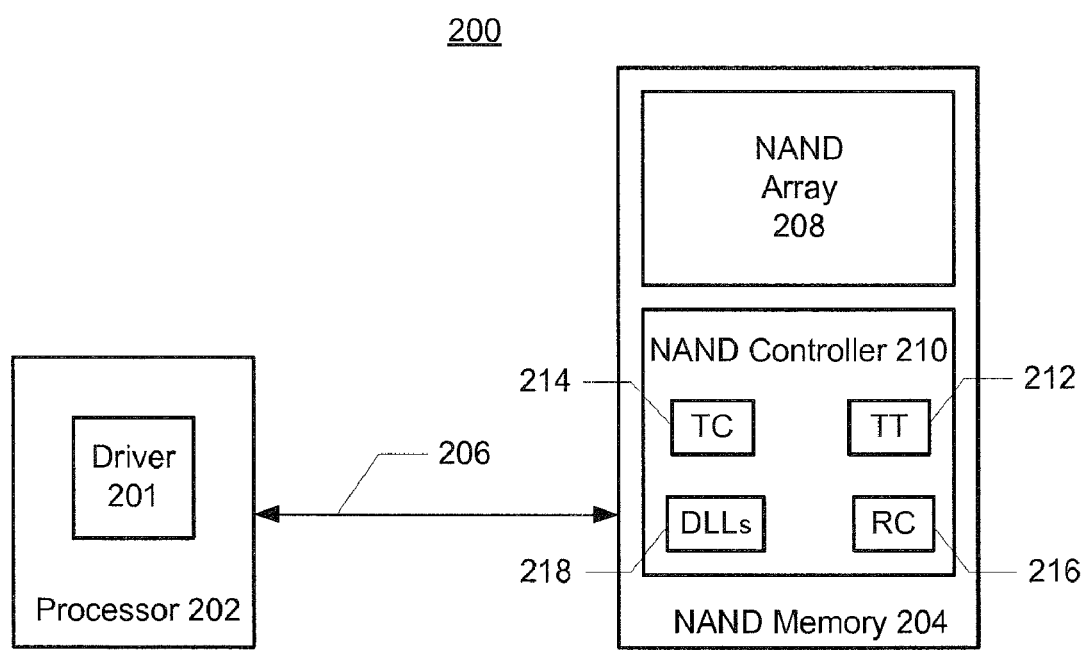
FIG. 2 is a block diagram illustrating an exemplary memory system.

FIG. 2 is a block diagram illustrating an exemplary memory system. The system 200 includes a processor 202 coupled to a NAND memory 204 via a bus interface 206. The processor 202 may be part of a host system that may be any type of electronic device that uses non-volatile memory, such as flash memory, including but not limited to a computer, an embedded device, or a handheld device, such as a cell phone, camera, a media/game player/recorder, a monitor, or a personal digital assistant (PDA), for instance.

The NAND memory 204 includes a NAND array 208, a NAND controller 210, one or more translation tables 212, and a translation cache 214. The NAND controller 210 performs memory management functions for the NAND array 208 as well as having the capability of executing algorithms. According to the exemplary embodiment, the NAND memory 204 is further provided with a real-time clock 216 and multiple digital lock loops (DLLs) 218, which the NAND controller 210 uses for performing optimization functions, as described below.

The NAND controller 210 can be any type of memory controller that manages memory access, including but not limited to flash disk controllers or central processing units (CPUs). Through the NAND controller 210, the NAND memory 204 may offer configurable interfaces that make the NAND memory 204 adaptable to different processor and memory types. Example standard interfaces for memory devices include CompactFlash® MultiMediaCard (MMC), Sony Memory Stick®, Secure Digital (SD) card, and the like. The processor interface to the NAND memory 204 may be in the form of a software driver 201 executed by the processor 202 that implements the features required by the NAND interface. The NAND memory 204 can be separate from, or part of, the host system. The processor 202 and the NAND memory 204 may be implemented as individual chips, a chipset, or as a system-on-a-chip (SoC).

The NAND controller 210 performs translation management that maps logical blocks accessed by high-level software from the host system into physical blocks in the NAND array 208. To do so, the NAND controller 210 maintains a logical to physical translation map between logical addresses supplied by the processor 202 and a physical list of pages in the NAND array 208. Typically, the translation maps are stored in the translations tables 212 in a relatively small amount of volatile storage. The logical to physical translation mappings may also be referred to simply as "logical to physical translations".

Figure 3:
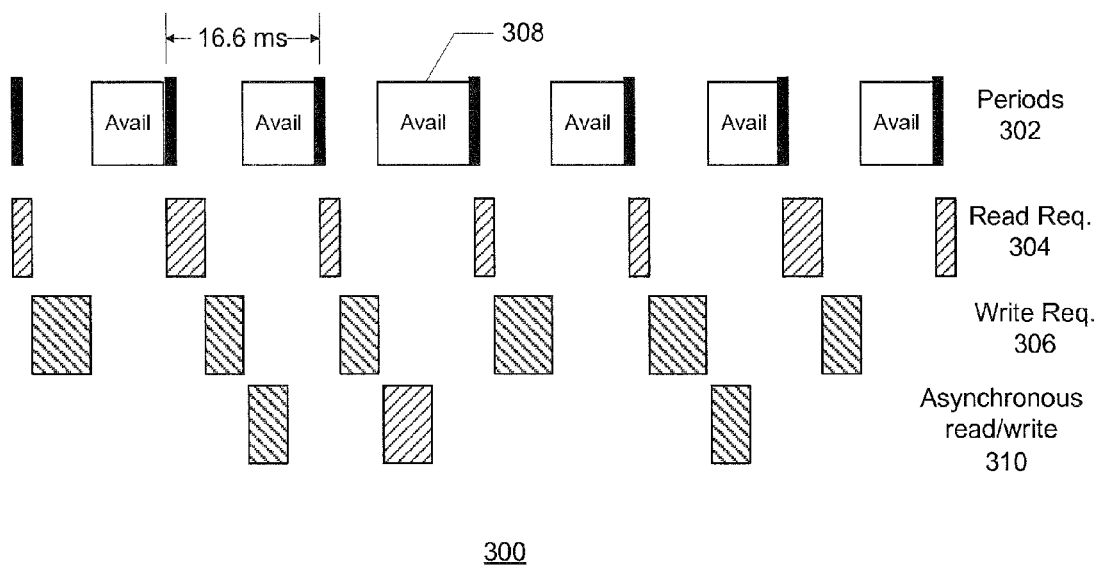
FIG. 3 is a diagram showing a portion of an exemplary schedule of memory request activity for an application that supports real-time media requirements.

FIG. 3 is a diagram showing a portion of an exemplary schedule of memory request activity for an application that supports real-time media requirements. In this example, a schedule of memory request activity 300 is shown for an application that supports a video stream at 30 frames per second (fps). The schedule shows that at 30 fps, the video stream has 16.6 ms periods 302, during which, read and write requests 304 and 306 to read/write logical blocks are made to the NAND memory 204 via the processor 202. After the read and write requests 304 and 306 are made, there is a time gap 308 left available in each period 302. Other memory activity may include asynchronous read/write requests 310 of the NAND memory 204 from asynchronous thread activity (such as from an e-mail client).

Referring to both FIGS. 2 and 3, the read and write requests 304 and 306 are sent as requests over bus 206 from the processor 202 to the NAND controller 210. The format typically includes a command, an address, and an optional data packet, where the command indicates whether to read or write; the address is the address of the logical block on which the command is being performed; and in the case of a write command, the data packet is the data to be written. Once the NAND controller 210 receives the requests, the NAND controller 210 translates the requests into memory access requests for the NAND array 208.

The translation tables 212 contain a set of entries mapping logical block addresses (i.e., logical block numbers) in the requests from the processor 202 to either an actual physical location/address of data in the NAND array 208 or to an unallocated block algorithm. The translation tables 212 can be searched by a requested logical block address, and the result is the physical address. When the NAND controller 210 receives a request to read a logical block address from the processor 202, the NAND controller 210 looks-up the logical block address in the translation tables 212 to find the logical block's physical address. The data located at this physical address is then retrieved and returned to the processor 202.

Because there is no limit to the amount of logical to physical block indirection (except that imposed by the total storage space), but there is a limit to the size of the translations tables 212, the NAND controller 210 maintains a translation cache 214 of the logical to physical translations to optimize throughput. The translation cache 214 has a fixed number of entries for caching a subset of the logical to physical translations stored in the translation tables 212. The translation cache 214 can be searched by a requested logical block address, and the result is the physical address. If the requested address is present in the translation cache, the search yields a match very quickly, after which the physical address can be used to access the NAND memory 204. If the requested address is not in the translation cache 214, a cache miss occurs. Whenever the requested logical block address cannot be found in the translation cache 214 and a cache miss occurs, it is necessary for the NAND controller 210 to scan the translation tables 212 to find this logical block and its corresponding physical translation and replace an old entry in the translation cache 214 with this currently active entry.

An algorithm such as least recently used or set associative, or other commonly used caching algorithms may be used take advantage of a presumed temporal or spatial locality and to manage the translation cache 214. However, in the absence of that kind of correlation, when the translation cache 214 misses, it is necessary for the NAND controller 210 to perform additional read operations on the translation tables 212 that were not requested by the processor 202. These additional read operations add delays and also add to the overall uncertainty of the NAND memory performance.

In response to write requests, the NAND memory 204 is managed by adding new allocation blocks instead of overwriting old allocation blocks, which eventually consumes all available blocks in the NAND array 208. Thus, at some point, garbage collection will need to be performed to reclaim storage allocated to stale or obsolete data, which can be time consuming. Garbage collection is time-consuming because garbage collection requires a reanalysis of the logical-to-physical translations, and the erase cycle time is the longest cycle time of any of the operations of the NAND memory 204.

In some memories, garbage collection can be as long as hundreds of milliseconds. Such a latent seat window may not be objectionable for an application, such as an e-mail client checking e-mail, but for a real-time application such as streaming video application, such latency would create an unacceptable application environment. One way to solve this problem would be to incorporate very large buffers to compensate for this large latency. The problem here is that the NAND controller in a conventional memory still would have no context into which to make its decisions. The algorithms in the NAND controller are based just on what the NAND controller sees, which are requests for logical blocks from the host system. Thus, conventional NAND memories lack an overall context to globally optimize garbage collection and translation cache pre-fetch processes because conventional NAND memories lacked knowledge of the semantics of a given block operation.

Accordingly, the exemplary embodiment provides a method and system for use of digital locked loop on channel tagged memory requests for performing internal optimization of a memory, such as the memory system 200. The exemplary embodiment provides a globally optimized solution that allows the NAND controller 210 to manage garbage collection (which can be moved in time) around one or more real-time media streams (which cannot be moved in time), thereby balancing the need for management of garbage collection with the needs of applications having different real-time media requirements.

The exemplary embodiment takes advantage of the fact that the NAND memory 204 is attached directly to the processor 202, and the processor 202 through a file system (not shown) and the driver 201 have knowledge of the current application environment of the host system. For example, the processor 202 may know that an e-mail client is running while a media recorder is concurrently recording a data stream and playing back the data stream, for instance. In accordance with one embodiment, read/write requests transmitted by applications from the processor 202 are tagged with channel IDs or other identifiers to associate related read/write requests with one another. The NAND controller 210 then uses the channel IDs associated with the read/write requests to track the requests using one or more digital locked loops in order to determine the context of the current application environment of the host system. This permits the NAND controller 210 to predict when to take advantage of NAND memory request idle times by performing opportunistic functions, such as updating the logical to physical translations or performing garbage collection cycles, for example, to globally optimize storage performance. According to one exemplary embodiment, storage performance is globally optimized by the NAND memory 204 creating a periodic time structure or real-time schedule showing when executing applications will have memory idle times. The NAND memory 204 divides garbage collection into atomic operations (read/write/erase) and performs those garbage collection atomic operations that can be done in the idle periods indicated in the real-time schedule so that garbage collection does not need to wait until the NAND array 208 is full.

Figure 4:
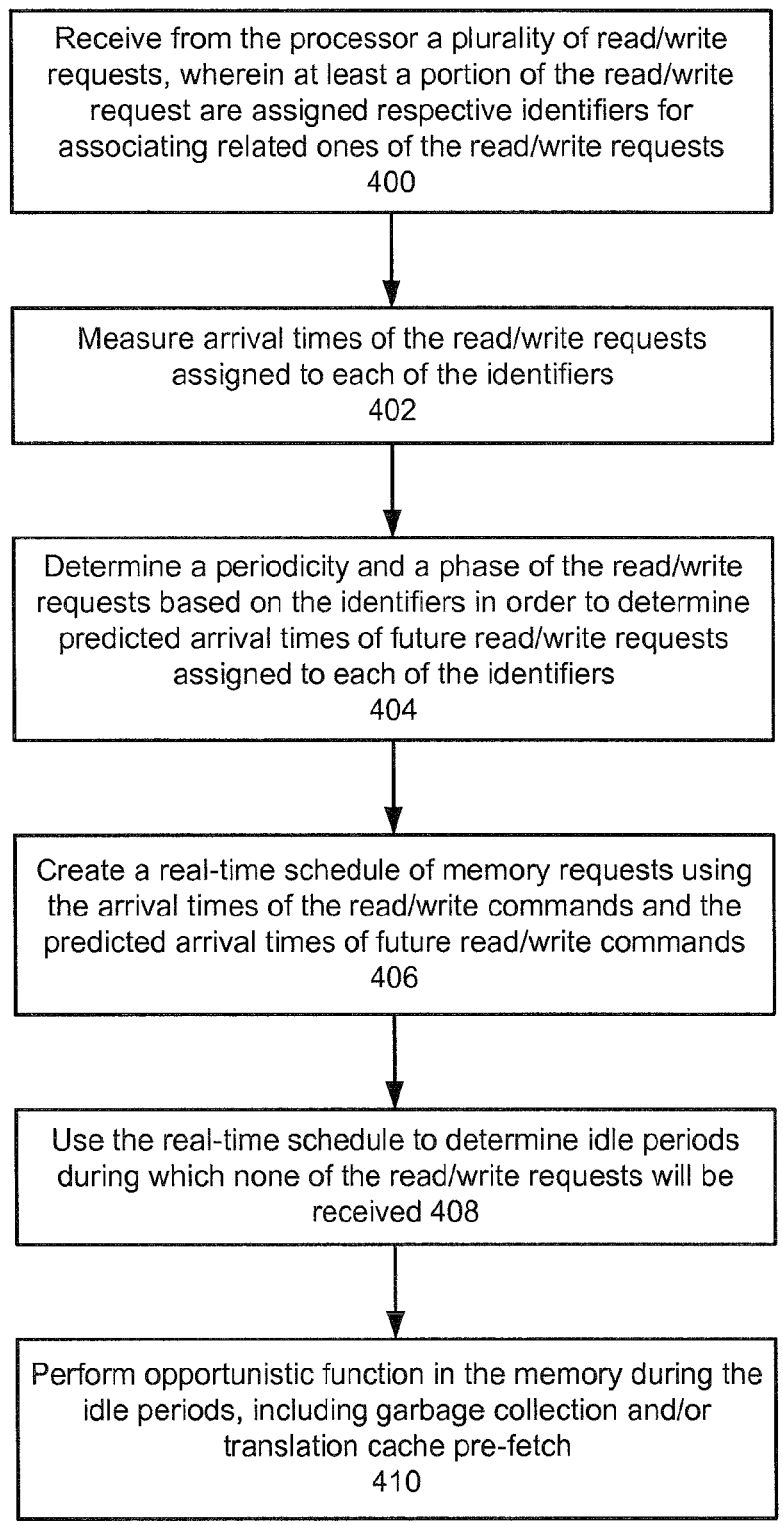
FIG. 4 is a flow diagram illustrating a process for performing optimization of a memory, such as the NAND memory, in accordance with an exemplary embodiment.

FIG. 4 is a flow diagram illustrating a process for performing optimization of a memory, such as the NAND memory 204, in accordance with an exemplary embodiment. The process may begin by the NAND memory 204 receiving from the processor 202 a plurality of read/write requests, wherein at least a portion of the read/write request are assigned respective identifiers for associating related ones of the read/write requests, such that a series of read/write requests having matching identifiers are associated and related with one another (block 400).

In one embodiment, the identifier may comprise a channel identifier (ID) that identifies a particular channel associated with an operating system (OS) function, an application, or thread, executing on the processor 202. In one embodiment, the channel ID may correspond to a file handle associated with the OS function or the application.

In one exemplary embodiment, the read/write requests are assigned the identifiers by tagging the read/write requests with the channel IDs. The read/write requests may be tagged by adding the channel ID as an additional command and/or field that is added to read/write requests transmitted from the processor 202 to the NAND memory 204, creating channel tagged read/write requests.

FIG. 5 is a diagram illustrating a format of a channel tagged read/write request for optimizing performance of the NAND memory 204 in accordance with one exemplary embodiment. The format of the channel tagged read/write request 500 sent from the processor 202 to the NAND memory 204 includes a command 502, an address 504, an optional data packet 506, and a channel ID 508. The command 502 indicates whether the request is a read or a write; the address 504 contains a logical block on which the command is being performed; and in the case of a write command, the data packet 506 contains the data to be written.

As stated above, the channel ID 508 identifies a particular channel associated with either an OS function, an application, or thread. The purpose of the channel ID 508 is to enable the transmission of a correlation function of a series of reads and/or writes to a particular channel. This correlation can be either temporal, where there is regular periodicity to the channel activity or can be spatial where spatial is defined as a logical connectedness to the sequence of addresses (e.g. incrementing logical blocks).

Since the purpose of the channel ID 508 is to optimize the scheduling of operations in the NAND memory 204, the correspondence between file handles and channel IDs 508 may not be 1:1. Instead, channel IDs 508 are associated with file system operations that are active and ongoing. This is usually a small subset of the total number of files. As an example, consider two applications or two threads of an application that are communicating via a file stored on the NAND memory 204. One thread writes data into the file and the other thread reads data. The receiving thread may periodically activate and check the file size to see if the file size has changed, as a change in file size indicates that there is additional data to process. Since the file size is maintained in the OS file system tables, (in one implementation) it is not necessary to activate the NAND memory 204. In this example, the receiving thread will wake up, interrogate the file system, receive an answer, and return to sleep, all of this occurs transparent to the NAND memory 204.

If, using the same example, the file size has changed, the receiving thread will have an open file handle (which the receiving thread created upon application invocation) and proceed to read the file. However, from the point of view of the NAND memory 204, the active transaction only occurs while the file is actively being read. In addition, there is a semantic blurring that can occur. The OS is aware that two threads have open file handles on the same file, and so has the ability to globally assign both read and write file handles to the same channel ID 508 via read/write requests. In this case, the receiving thread (via the OS file system drivers) reuses the writing thread's channel ID 508 in read requests.

Referring again to FIG. 4, as the read/write requests are received, the NAND memory 204 measures arrival times of the read/write requests assigned to each of the identifiers (block 402). According to one embodiment, the NAND controller 210 uses the real-time clock 216 (FIG. 2) to measure a set of relative inter-arrival times for the read requests and a set of relative inter-arrival times for the write requests. In one embodiment, the real-time clock 216 need only keep track of a relative time of day, absolute time is not necessary.

According to the exemplary embodiment, the NAND controller 210 determines a periodicity and a phase of the read/write requests based on the identifiers in order to determine predicted arrival times of future read/write requests assigned to each of the identifiers (block 404).

According to one exemplary embodiment, the NAND controller 210 may determine the periodicity of the read/write requests based on the arrival times and the identifiers. The periodicity for the read requests may be determined based on the set of arrival times for the read requests for each identifier, and the periodicity for the write requests may be determined based on the set of arrival times for the write requests for each identifier. In one embodiment, the NAND controller 210 records a set of arrival times when each type of command (e.g., read and write) is received from the processor 202 for each application/channel ID 508.

Referring to FIG. 3, the exemplary embodiment takes advantage of the fact that a repeating pattern develops around the times the read/write requests occur during real-time media. By examining on a per identifier basis the times at which the read/write requests occur, i.e., the arrival times, the NAND controller 210 can make a determination of whether a sequence of read/write requests are operations used to process a real-time media stream based on whether there is a repeating pattern to the read/write requests, e.g., every 16.6 ms, as in a video frame rate. This repeating pattern stands out with respect to the other "random" asynchronous operations, e.g., asynchronous read/write 310.

After calculating the periodicity, the NAND controller 210 locks onto a phase of the periodicity using the read/write requests to determine predicted arrival times of future read/write requests. In one exemplary embodiment, the NAND controller 210 inputs the read/write requests to one or more digital lock loops (DLLs) 216 (FIG. 2) to lock onto a phase of the periodicity. A digital lock loop is a discrete time version of a phase lock loop. In one embodiment, because there can be different media streams (for different applications/channel IDs as well as read and write request streams) each request type (read or write) and its periodicity is assigned a digital lock loop, resulting in multiple digital lock loops. For example, the read requests may be input to one digital lock loop to attempt to lock onto the phase of the periodicity of the read requests, and the write requests may be input to a second digital lock loop to attempt to lock onto the phase of the periodicity of the write requests.

Referring again to FIG. 4, the NAND controller 210 creates a real-time schedule of memory requests using the arrival times of the read/write requests and the predicted arrival times of future read/write requests (block 406). The NAND controller 210 then uses the real-time schedule to determine idle periods during which none of the read/write requests will be received (block 408). In one embodiment, the NAND controller 210 performs opportunistic functions in the memory during the idle periods, including performing garbage collection and/or translation cache pre-fetch (block 410).

The NAND controller 210 can use the sequence of read/write requests in the real-time schedule to identify gaps or idle periods. It can be determined that opportunistic functions, such as garbage collection can be safely done because it has been predicted that no read/write requests are scheduled for processing or arrival, and if no read/write requests arrive, the NAND controller 210 can use the time to perform background garbage collection and/or cache pre-fetch operations.

Figure 6:
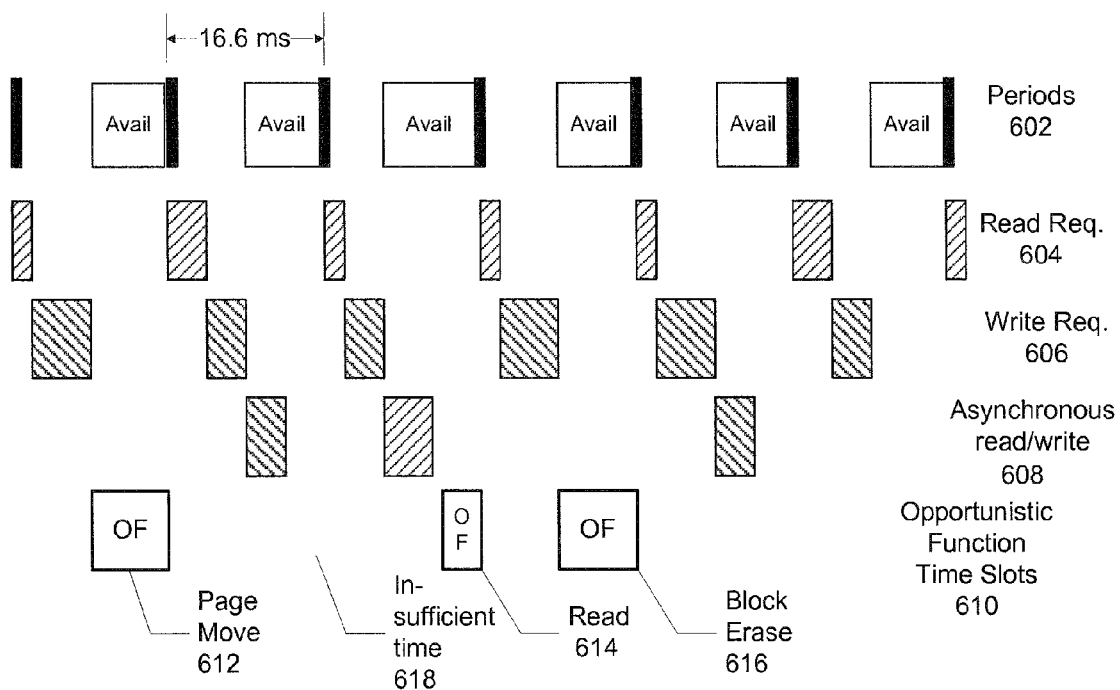
FIG. 6 is a diagram illustrating a portion of an exemplary real-time schedule for a NAND memory that takes into account activity of an application that supports real-time media requirements, such as a video stream.

FIG. 6 is a diagram illustrating a portion of an exemplary real-time schedule for a NAND memory 204 that takes into account activity of an application that supports real-time media requirements, such as a video stream. The real-time schedule 600 includes time periods 602 (e.g., 16.6 ms in length) during which an application may make read request 604 and write request 606 of the NAND memory 204 for processing the real-time media stream, which are received as read and write requests. The application's read and write requests 604 and 606 for the real-time media have priority and are processed first.

According to the exemplary embodiment, a time gap is left over in each period 602 during which at least one of two additional items may be scheduled. First, asynchronous read/write requests 608 of the NAND memory 204 from asynchronous thread activity (such as from an e-mail client) may be scheduled that take priority.

Second, opportunistic function (OF) time slots 610 may be scheduled to indicate idle periods when no read or write requests associated with the OS, application or a media stream will be made of the NAND memory 204. During the OF time slots 610, opportunistic functions such as garbage collection or translation cache pre-fetch may be performed. Each OF timeslot 610 minimally indicates the time duration of the idle period. According to one embodiment, the real-time schedule 600 for the NAND memory 204 is designed to take into account the needs of the real-time media stream as well as the expected performance of the memory. That is, in the embodiment where opportunistic garbage collection is performed, the minimum time duration for the idle periods of the OF timeslots 610 in the real-time schedule 600 may be greater than the minimum time necessary for the memory to perform a block erase. For example, since it takes up to 3 milliseconds to erase a block, the minimum time duration for the idle periods of the OF timeslots 610 in the real-time schedule 600 must be greater than 3 milliseconds or the first time the memory needs to erase a block, the real-time schedule 600 may overflow.

By creating a new "Opportunistic Function" time slots 610, the NAND controller 210 can auto-detect available time slots for which it may perform opportunistic functions such as garbage collection and translation cache pre-fetch. By recovering the real-time schedule from the channel IDs 508, the OF time slots 610 can be reconstructed with high accuracy.

In a further embodiment, the NAND controller 210 can be configured to use a period threshold that can be set to allow for jitter in the arrival times of the read/write requests during the calculation of the periodicity, such that read/write requests having arrival times within the period threshold are considered to be in the observed period. An example period threshold may be 1-2 hertz, for example, so that a read/write command arriving at 29 Hz is considered to be within the 30 Hz period.

The data being written and read from the NAND array 208 may be compressed media rather than raw audio or video. This optimizes the needed storage at the expense of processing power. (Also most media is currently compressed in some way.) Because of this compression, the amount of data per unit time sent between the processor 202 and the NAND memory 204 can vary according to the compression and the actual media content. Because of this varying data set size, there may be considerable jitter in the arrival times of regularly scheduled operations. Accurately locking to a periodic signal with a large jitter poses conflicting requirements.

By separating the read/write requests streams into the respective channel IDs 508, the inter-arrival time of the channel IDs 508 can be maintained separately and the NAND controller 210 can lock onto each stream. Moreover, as each stream request changes in size, the arrival time of next expected request can be altered. For example, assume that in the real-time schedule of FIG. 6, the first read request varies in size and therefore the arrival time of the following media write request contains considerable jitter. What the phase locking mechanism can take into account is the extended operation taken by the read request, which can be subtracted from the time for the write request. Since the length of time taken by the read can be measured, the jitter to the write can be subtracted, improving the lock.

Examining the FIG. 6 again, it can be seen that a period comprises successive requests, essentially back-to-back followed by an idle period where the software scheduler has determined that no operation can be guaranteed to run to completion in the real-time schedule.

According to the exemplary embodiment, to remove the jitter from any current read/write request of a channel ID, the total time taken by all consecutive read/write requests prior to the current request, up to the most recent idle time, are subtracted from the arrival time of the current read/write request, and this arrival time may be used as feedback for the DLL lock.

It is possible that the real-time schedule will be maximally full, where there is essentially no idle time to measure. In this case the inter-arrival time can be assumed to be periodic and the jitter removal can be performed modulo the measured period. If the inter-arrival times have an average with a relatively small standard deviation, that average is presumed to be the period and is the basis of the modulo arithmetic.

Figure 7:
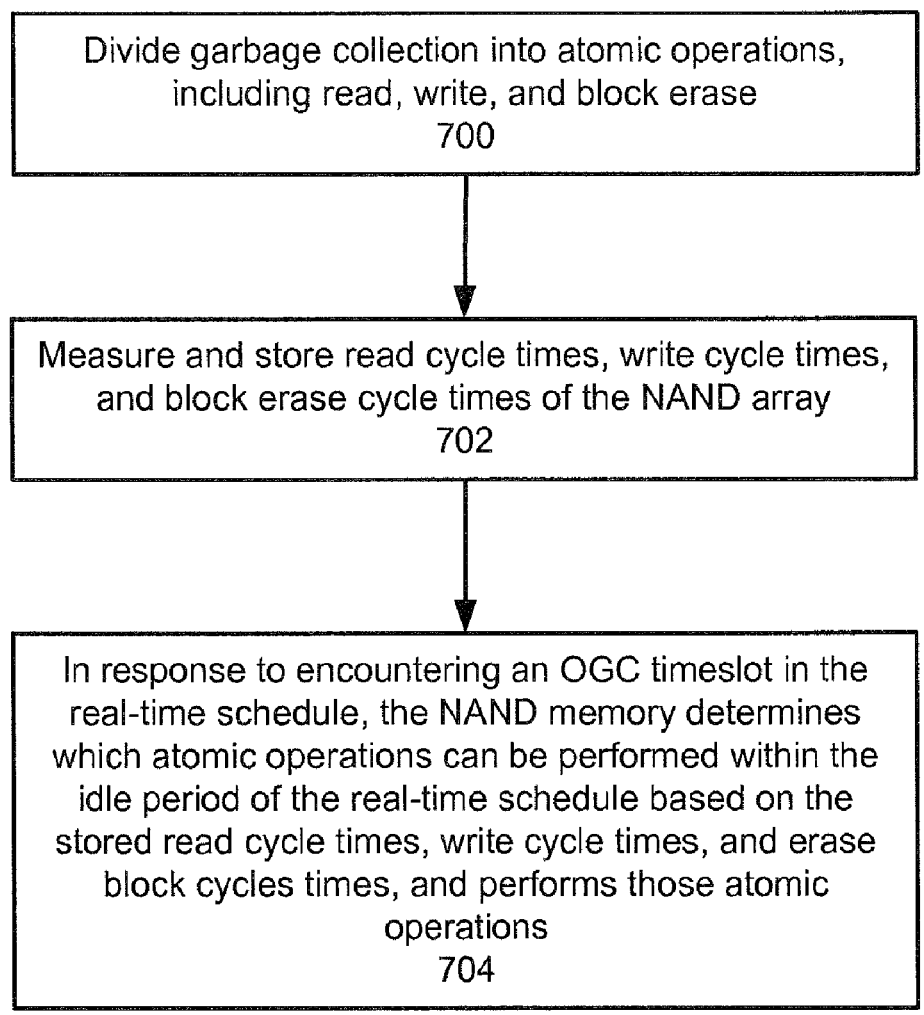
FIG. 7 is a flow diagram illustrating the process for performing opportunistic garbage collection based on OF timeslots in accordance with one exemplary embodiment.

FIG. 7 is a flow diagram illustrating the process for performing opportunistic garbage collection based on the OF timeslots in accordance with one exemplary embodiment. The process may begin with the NAND controller 210 dividing garbage collection into atomic operations, including read, write, and block erase (block 700). In one embodiment, the garbage collection in the NAND memory 204 is divided into two primary phases: move and erase, where the move phase is the movement of current data to make an erase block completely stale; and the erase phase is the erasure of the erase block via a block erase. In one embodiment, the erase phase is further divided into read and write cycles. The move and erase phases may be further divided into sub-operations that go into the two steps that affect maintenance of the translation tables as well as handling wear leveling and power fail.

Thereafter, during operation of the NAND memory 204, the read/write cycle times and block erase cycle times of the NAND array 208, which correspond to the garbage collection atomic operations, are measured and stored for tracking (block 702). Using currently available NAND memories as an example, typical read cycle times are in the range of 25 to 50 microseconds, typical write cycle times are in the range of 200 to 700 microseconds, and block erase cycle times are in the range of 2,000 to 3,000 microseconds.

Depending on the type of memory involved, the type of read and write cycle times that may be measured and stored may include page read and page write cycle times, or block read and block write cycle times, or both. In one embodiment, the read cycle times, write cycle times, and block erase cycle times are stored by NAND controller 210.

In response to encountering an OF timeslot 610 in the real-time schedule 600, the NAND memory 204 determines which ones of the atomic operations can be performed within the idle periods of the real-time schedule based on the stored read cycle times, write cycle times, and erase block cycles times, and performs those atomic operations (block 704). Each OF timeslot 610 includes an argument for conveying the time duration of the idle period, i.e., the amount of time left in the current time slot in which garbage collection can be done. In one embodiment, the NAND controller 210 compares the stored read cycle times, write cycle times, and block erase cycle times with the time duration of the OF time slot 610 to determine which ones of the atomic operations can be performed within the given time duration. The NAND memory 204 now has knowledge of how long it takes to perform each task during OF, and for how long the application(s) executing on the processor 202 will not make memory requests. From this knowledge, the NAND memory 204 can determine which OF task to perform. For example, if an OF timeslot 610 indicates that the idle time duration is 1 ms, the NAND memory 204 may determine that there is enough time to read or write a page during OF, but not enough time to erase a block, which may take 3 ms, for example.

FIG. 6 shows example OF atomic operations that could be performed in the available times during the issued OF timeslots 610. Examples shown include a page move 612, a read 614, and a block erase 616. Also shown is an insufficient time 618 in the real-time schedule 600 to issue an OF atomic operation.

According to the exemplary embodiments, if the NAND memory 204 has a block to garbage collect and there is sufficient idle time to fully implement only one or more atomic operations, these atomic operations are performed, but by iteratively performing a sufficient number of atomic operations, the block is completely collected.

For example, when receiving the OF timeslot 610, the NAND memory 204 may begin to look up erase blocks to garbage collect according to an internally executed algorithm, but will also take into account that there is only the specific time duration of one or more idle periods to spend on the activity. If the memory received an OF timeslot 610 indicating an idle period of 5 milliseconds, for instance, then the memory may locate pages to move, and move approximately 5 of the pages. The computation time, the page read access and the write cycle time (using parameters typical of current NANDs) would allow the memory to only move these 5 pages. This would be repeated until enough pages had been moved to make the entire erase block stale. Finally a 3 millisecond erase cycle would fit in the allotted OF time of 5 milliseconds, and an erase block would be reclaimed.

Conventionally, garbage collection is performed when a volume reaches a predetermined percentage of fullness, such as a 90% volume full threshold, for example. According to a further aspect of the exemplary embodiment, an OF threshold is provided that is less than the normal garbage collection threshold that is used to trigger issuance of the OF atomic operations. In one embodiment, this second threshold is programmable with a configuration command, but as one example, may be set at approximately 80% of volume full. Thus, in this embodiment, the processor 202 would not issue an OF atomic operation until the NAND memory 204 reaches 80% full.

By apportioning specific OF time slots 610 and by having a lower threshold applied to this opportunistic garbage collection, the exemplary embodiments make it no longer necessary for the NAND memory 204 to insert a large asynchronous garbage collection event into the real-time media stream, which may result in a significant reduction in required latency buffers.

A method and system for using a digital locked loop on channel tagged memory requests for memory optimization has been disclosed. The present invention has been described in accordance with the embodiments shown, and there could be variations to the embodiments, and any variations would be within the scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made without departing from the scope of the appended claims.

I claim:

1. A method for performing memory optimization on a memory, the method comprising:
    receiving from a processor a plurality of read/write requests, wherein at least a portion of the read/write requests are assigned respective identifiers for associating related requests of the read/write requests;
    measuring arrival times of the read/write requests assigned to each of the identifiers;
    determining predicted arrival times of future read/write requests assigned to each of the identifiers;
    creating a real-time schedule of memory requests using the arrival times of the read/write requests and the predicted arrival times of the future read/write requests;
    using the real-time schedule to determine idle periods during which none of the read/write requests will be received; and
    performing opportunistic functions in the memory during the idle periods, including performing at least one of garbage collection or translation cache pre-fetch.

2. The method of claim 1, wherein each of the identifiers comprise a channel ID that identifies channels associated with at least one of an operating system function, an application, or a thread.

3. The method of claim 2, wherein the channel ID comprises a field added to the read/write requests.

4. The method of claim 1, wherein measuring arrival times of the read/write requests assigned to each of the identifiers further comprises measuring a set of relative inter-arrival times for read requests and a set of relative inter-arrival times for write requests.

5. The method of claim 1, wherein determining the predicted arrival times of future read/write requests comprises determining a periodicity and a phase of the read/write requests based on the arrival times and the identifiers of the read/write requests.

6. The method of claim 5, wherein determining the periodicity of the read/write requests further comprises determining a first periodicity of read requests based on a first set of arrival times for the read requests, and determining a second periodicity of write requests based on a second set of arrival times for the write requests.

7. The method of claim 1, wherein determining the predicted arrival times of future read/write requests comprises locking onto a phase of a periodicity of read requests or of write requests to determine the predicted arrival times of the future read/write requests.

8. The method of claim 7, wherein locking onto a phase further comprises using one or more digital lock loops for locking onto a first phase of the first periodicity of the read requests, and locking onto a second phase of the second periodicity of the write requests.

9. The method of claim 7, further comprising removing jitter from a current read/write request associated with a first identifier by subtracting a total time taken by all consecutive read/write requests associated with the first identifier prior to the current read/write request, up to a most recent idle time, from an arrival time of the current read/write request; and using this arrival time as feedback for the one or more digital lock loops.

10. The method of claim 1, further comprising:
dividing the garbage collection into atomic operations, including read, write, and block erase;
measuring and storing read cycle times, write cycle times, and block erase cycle times of the memory; and
determining which ones of the atomic operations can be performed within the idle periods of the real-time schedule based on the stored read cycle times, write cycle times, and erase block cycles times, and performing those atomic operations.

11. A memory system comprising:
a memory array comprising physical locations;
a translation cache to cache entries mapping logical block addresses to the physical locations of the memory array; and
a memory controller to perform memory management functions for the memory array, including;
receiving a plurality of read/write requests,
wherein at least a portion of the read/write requests are assigned respective identifiers for associating related requests of the read/write requests;
measuring arrival times of the read/write requests assigned to each of the identifiers;
determining predicted arrival times of future read/write requests assigned to each of the identifiers;
creating a real-time schedule of memory requests using the arrival times of the read/write requests and the predicted arrival times of the future read/write requests;
using the real-time schedule to determine idle periods during which none of the read/write requests will be received; and
performing opportunistic functions during the idle periods, including performing at least one of garbage collection or translation cache pre-fetch.

12. The memory system of claim 11, wherein the identifiers comprise a channel ID that identifies channels associated with at least one of an operating system function, an application, or a thread.

13. The memory system of claim 11, wherein the memory controller is configured to determine a periodicity of the read/write requests based on the arrival times and the identifiers of the read/write requests.

14. The memory system of claim 13, wherein the memory controller is configured to determine a first periodicity of read requests based on a first set of arrival times for the read requests, and determines a second periodicity of write requests based on a second set of arrival times for the write requests.

15. The memory system of claim 11, wherein the memory controller is configured to lock onto, using one or more digital lock loops, a phase of a periodicity of selected read/write requests to determine the predicted arrival times of the future read/write requests.

16. The memory system of claim 15, wherein the memory controller is configured to lock onto a first phase of a first periodicity associated with read requests, and to lock onto a second phase of a second periodicity associated with write requests.

17. The memory system of claim 11, wherein the memory controller performs further functions including:
dividing garbage collection into atomic operations, including read, write, and block erase;
measuring and storing read cycle times, write cycle times, and block erase cycle times of the memory;
determining which ones of the atomic operations can be performed within the idle periods of the real-time schedule based on the stored read cycle times, write cycle times, and erase block cycles times, and performing those atomic operations.

18. The memory system of claim 11, wherein each of the idle periods comprises an opportunistic function time slot that indicates when no read request or write requests associated with at least one of an operating system, application or a media stream will be made of the memory.

19. The memory system of claim 11, wherein the memory system comprises a NAND memory having a NAND array and a NAND controller.

20. A non-transitory computer-readable medium containing program instructions for performing memory optimization on a memory, the program instructions for:
measuring arrival times of related requests from a plurality of read/write requests received from a processor, wherein the read/write requests include a field for storing an identifier for associating the related memory requests of the read/write requests;
determining predicted arrival times of future read/write requests assigned to each of the identifiers;
creating a real-time schedule of memory requests using the arrival times of the read/write requests and the predicted arrival times of the future read/write requests;
using the real-time schedule to determine idle periods during which none of the read/write requests will be received; and
performing opportunistic functions in the memory during the idle periods, including performing at least one of garbage collection or translation cache pre-fetch.

* * * * *